May 19, 1931. H. SIRY 1,806,424

AUTOMOBILE HEADLIGHT

Filed Dec. 28, 1928

Herbert Siry,
INVENTOR

BY Victor J. Evans
ATTORNEY

Patented May 19, 1931

1,806,424

UNITED STATES PATENT OFFICE

HERBERT SIRY, OF NEWPORT, KENTUCKY

AUTOMOBILE HEADLIGHT

Application filed December 28, 1928. Serial No. 329,029.

This invention relates to self tilting reflectors for headlights of motor vehicles, the general object of the invention being to increase the lighting effect on the road from the headlights when the vehicle is travelling either up or down hill by automatically tilting the reflectors downwardly when on the hill that the rays of light will be brought on the road in closer proximity to the front of the vehicle than when travelling on level ground and thereby obviate the rays of light from striking the road too far in advance of the vehicle as now customary in non-tilting reflectors or stationary headlights.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
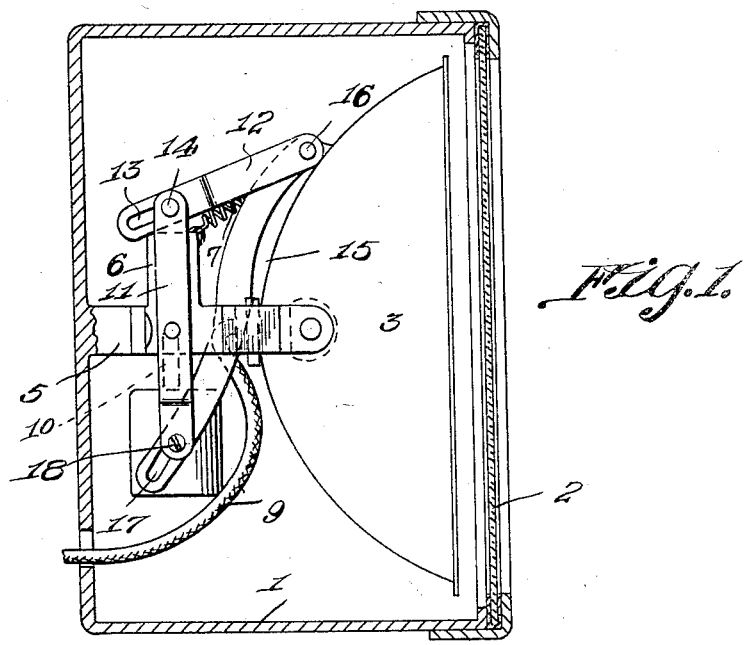
Figure 1 is a vertical sectional view through a lamp showing the reflector and the parts of the invention in elevation.
Figure 2:
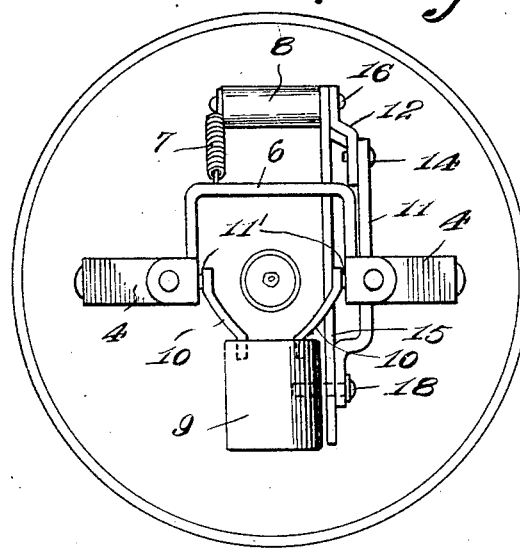
Figure 2 is a view of the rear of the reflector, with the parts of the invention attached thereto.
Figure 3:
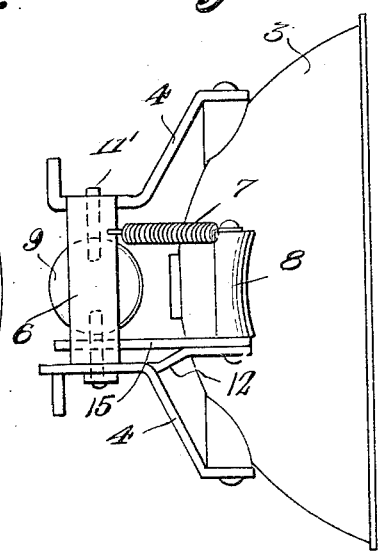
Figure 3 is a top plan view of Figure 2.

In these views, 1 indicates the lamp casing, 2 the lens thereof and 3 indicates the reflector which carries the lamp bulb. In carrying out my invention, I pivot the reflector to a pair of arms 4 so that the reflector will have pivotal movement on a horizontal axis. The rear ends of the arms are bent at right angles and fastened to projections 5 which extend forwardly from the rear end of the casing. A yoke part 6 is connected with parallel portions of the two arms 4, this yoke part being vertically arranged and a coil spring 7 has one end connected with the top of the yoke and its other end is connected with a projection 8 formed on the top part of the reflector. A weight 9 has a pair of upwardly extending arms 10 connected therewith, each arm having a pintle 11' which is journaled in the parallel part of each arm 4 so that the weight has rocking movement between the arms 4. A lever 11 is fastened to the outer end of one of these pintles so that the lever moves with the weight. A link 12 has one end pivoted to an end of the projection 8 and its other end is provided with a slot 13 through which a pin 14 passes, this pin being carried by the upper end of the lever 11. A long curved link 15 is pivoted to the projection 8 by the pin 16 which pivots the link 12 to said projection and the other end of said link 15 is slotted, as at 17, to receive a pin 18 carried by the lower end of the lever 11.

A device constructed in accordance with the foregoing description and accompanying drawings will tilt the reflector downwardly when the vehicle is travelling either up or down hill for the purpose of providing better illumination to the road over that obtained by the non-tilting reflectors or stationary headlights now in use. When the vehicle is travelling down hill, the weight 9 swings forwardly, moving the link 15 upwardly and forwardly which tilts the reflector downwardy to reflect the rays of light on the road in closer proximity to the front of the vehicle than that when the vehicle is travelling on level ground, consequently preventing the rays of light from striking the road too far in advance of the respective vehicle which occurs with the stationary type of headlight. The movement of the weight forwardly to operate the link 15 also swings the lower end of the lever 11 forwardly and the upper end thereof rearwardly, and the pin 14 slides in the slot 13 as not to effect the link 12. The device when travelling up hill, the weight swings rearwardly, carrying the lower end of the lever 11 rearwardly and the upper end thereof forwardly, causing the reflector to tilt downwardly by the link 12 directing the rays of light in closer proximity to the front of the respective vehicle than when travelling on level ground to better illuminate the road and which prevents the rays of light from projecting too far in advance of the vehicle or toward the sky as now is customary with the non-tilting reflector or stationary headlight. The movement of the lower end of the lever 11 rearwardly, the pin 18 moves in a slot 17 not effecting the reflector through the link 15. Immediately on the vehicle again travelling on level ground, the lever 11 assumes a vertical position under the influence of the weight properly positioning the reflector to project the rays of light on the road the correct distance ahead of the vehicle for efficient illumination of the road and objects thereon.

It is thought from the foregoing description that the advantages and novel features of my invention will be readily apparent.

It is to be understood that I may make changes in the construction and in the combination and arrangement of the several parts, provided that such changes fall within the scope of the appended claim.

What I claim is:—

An automobile headlight including a casing rigidly mounted on a vehicle and a reflector carrying an illuminating means, spaced horizontally disposed arms secured to the casing and pivotally supporting the reflector in the casing for movement about a horizontal axis, an upwardly extending yoke formed on said arms, a spring between said yoke and the reflector, a depending weight pivoted to said arms, a lever secured to the pivot of the weight and movable with the latter, a link pivotally and slidably connected to the upper end of the lever and pivoted to the reflector to tilt the reflector downwardly on movement of the weight in one direction caused by the vehicle travelling up hill, and a curved link pivotally and slidably secured to the lower end of the lever and pivoted to the reflector to tilt the reflector downwardly by the movement of the weight in an opposite direction when the vehicle is travelling down hill.

In testimony whereof I affix my signature.

HERBERT SIRY.